United States Patent [19]
Toson

[11] Patent Number: 5,732,798
[45] Date of Patent: Mar. 31, 1998

[54] DISC BRAKE WITH THE CALIPER REACTION PASSING THROUGH A WHEEL FIXED SUPPORT AXLE PREFERABLY FOR MOTORCYCLE FRONT WHEELS WITH A PERIPHERAL ANNULAR DISC

[75] Inventor: Emanuele Toson, Moncalvo, Italy

[73] Assignee: Brakko S.R.L., Rescaldina, Italy

[21] Appl. No.: 437,505

[22] Filed: May 9, 1995

[30] Foreign Application Priority Data

Aug. 10, 1994 [IT] Italy .................... BG94A0038

[51] Int. Cl.⁶ ...................................... B60T 1/06
[52] U.S. Cl. .............. 188/18 A; 188/344; 188/71.5; 188/73.46; 180/219; 280/279
[58] Field of Search .................... 188/18 A, 344, 188/71.5, 72.1, 72.4, 73.46, 26; 180/219; 280/279; 301/110.5, 110.6, 124.2, 125

[56] References Cited

U.S. PATENT DOCUMENTS

| | | |
|---|---|---|
| 3,899,049 | 8/1975 | Martin ................ 188/18 A |
| 4,062,427 | 12/1977 | Klaue ................. 188/18 A |
| 4,703,839 | 11/1987 | Nakano et al. ....... 188/344 X |

FOREIGN PATENT DOCUMENTS

| | | |
|---|---|---|
| 0170438 | 2/1986 | European Pat. Off. . |
| 0382683 | 8/1990 | European Pat. Off. . |
| 0699576 | 3/1996 | European Pat. Off. . |
| 1028775 | 5/1953 | France . |
| 1194525 | 11/1959 | France . |
| 1292391 | 3/1962 | France . |
| 2691773 | 12/1993 | France . |
| 062733 | 7/1891 | Germany ............ 301/110.5 |
| 100477 | 8/1962 | Norway ............. 301/110.5 |

*Primary Examiner*—Peter M. Poon
*Attorney, Agent, or Firm*—Steinberg, Raskin & Davidson, P.C.

[57] ABSTRACT

A disc brake, preferably for motorcycle front wheels, including a peripheral annular disc and arranged such that its caliper reaction passes through a fixed axle coaxial with the wheel axis. The caliper is mounted at the end of a radial arm rigidly connected to the axle and the axle is torsionally keyed into at least one antirotation seat at a respective cooperating portion of the wheel support.

18 Claims, 4 Drawing Sheets

U.S. Patent    Mar. 31, 1998    Sheet 1 of 4    5,732,798
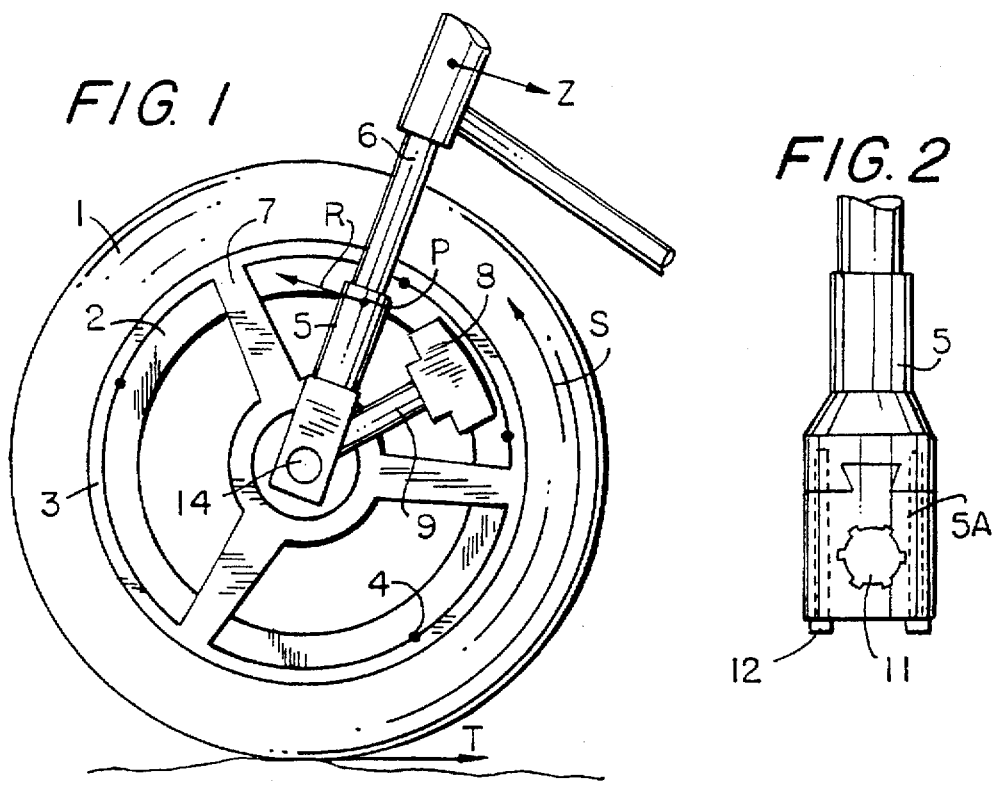
FIG. 1
FIG. 2
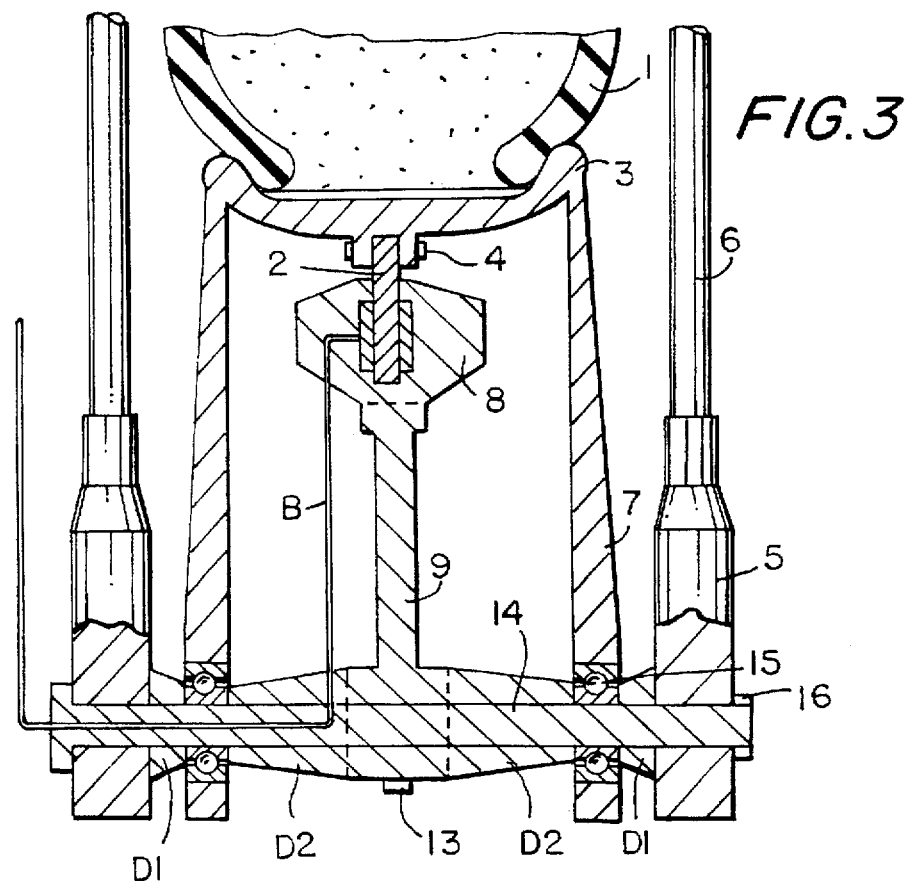
FIG. 3

DISC BRAKE WITH THE CALIPER REACTION PASSING THROUGH A WHEEL FIXED SUPPORT AXLE PREFERABLY FOR MOTORCYCLE FRONT WHEELS WITH A PERIPHERAL ANNULAR DISC

FIELD OF THE INVENTION

The present invention relates to a peripheral annular disc brake, preferably for motorcycle front wheels, having its caliper reaction passing through a wheel fixed support axle.

BACKGROUND OF THE INVENTION

It is known that modern motorcycles have considerable power, requiring likewise powerful brakes. The brakes currently used are of the "disc" type and consist of one or more discs fixed parallel to the wheel and braked by their individual caliper, which causes suitable "pads" of high friction coefficient to slide against them. This type of brake uses discs which, being fixed on the wheel hub, have a small centrifugal extension, hence providing two pad sliding tracks which are relatively small and do not allow adequate disposal of the heat produced on them.

When motorcycle front wheels are braked, the lateral arrangement of the disc and the fixing of the caliper to one of the two rods of the wheel steering fork creates forces eccentric to the steering axis which create steering moments dangerous for the attitude of the motorcycle. In general braking devices, the caliper is fixed to the frame in a rigid manner, causing wheel braking which is immediate and consequently difficult to control gradually. For motorcycle front wheel braking, the caliper is mounted on the wheel steering fork in an approximately intermediate position which obviously depends on the diameter of the brake disc, the greater the diameter, the further the caliper lies from the point through which the wheel axle passes. Consequently, if the fixing of the brake caliper to the fork creates an elastic response due to the flexure of the fork, this response is progressively more rigid the further the caliper lies from the wheel axis.

Hence, in the case of high-power motorcycles, the use of large brake discs makes braking less progressive, other technical factors being equal, the larger the discs, the higher the point in which the caliper is fixed to the fork. This response rigidity also favors lifting of the rear wheel, which consequently loses its adhesion to the ground and reduces the overall braking capacity of the motorcycle. If a single caliper is used, as in the case of the conventional system, wheel turning takes place during braking, with consequent unbalancing of the vehicle.

OBJECTS AND SUMMARY OF THE INVENTION

An object of the present invention is to define a disc brake provided with very extensive braking tracks which reduce the operating temperature and therefore allow prolonged use.

A further object of the present invention is to reduce the lifting of the rear of the motorcycle consequent on sudden braking of the front wheel.

Another object of the present invention is to define a brake of the aforesaid type, which enables the caliper to undergo initial elastic dragging resulting in a softer braking action, in order to prevent wheel locking and impact against the forks.

These and further objects will be seen to be attained on reading the following detailed description regarding a disc brake, preferably for motorcycle front wheels, with an annular disc, having the characteristic that the discharged caliper reaction passes through a fixed axle coaxial to the wheel axis. The caliper is mounted at the end of a radial arm rigid with the axle, while the axle is torsionally keyed into antirotation seats at the fork ends which act as the wheel support.

More particularly, one embodiment of the motorcycle suspension and wheel assembly for a wheel of a motorcycle having a rotational axis in accordance with the invention comprises a wheel support for retaining the wheel, a rim for retaining a tire on an outer surface thereof, the rim having edges and a width defined between the edges of the rim, a fixed axle having a central axis coincident with the rotational axis of the wheel, coupling means for fixedly coupling the axle to the wheel support to prevent rotation of the axle with respect to the wheel support (e.g., an antirotation seat), and an annular disc coupled to the wheel and having a hollow central region. The annular disc is arranged to surround the axle such that the axle is situated in the hollow central region of the annular disc and an annular space remains between the axle and the annular disc. Also, the annular disc is mounted directly on an inner surface of the rim facing the rotational axis of the wheel in a middle or central position between the edges of the rim. To achieve the objects of the invention, the assembly includes an elongate radial arm having a first end rigidly attached to the axle and a second end opposite to the first end and a caliper mounted at the second end of the radial arm in a position so as to be engageable with the annular disc.

In other embodiments, the wheel support comprises a fork having two prongs between which the wheel is situated, the axle is elongate and extends at least between the prongs and the coupling means comprise at least one end of the axle being splined and a portion of a respective one of the prongs of the wheel support having a recess receivable of the splined end of the axle. Alternatively, the coupling means may comprise each end of the axle being splined and a portion of each of the prongs of the wheel support having a recess receivable of a respective one of the splined ends of the axle. As another alternative, the coupling means may comprise an antirotation seat arranged in connection with the wheel support whereby an end of the axle is torsionally keyed into the antirotation seat. The assembly may comprise an additional elongate radial arm having a first end rigidly attached to the axle and a second end opposite to the first end, and an additional caliper mounted at the second end of the additional radial arm in a position so as to be engageable with the annular disc. In this embodiment, the additional radial arm is angularly spaced from the radial arm. The wheel may comprise elongate spokes rotatingly coupled at a first end to the axle and fixedly coupled at a second end opposite to the first end to the rim. If the annular disc is situated in a plane, the spokes may be arranged in a plane substantially parallel to the plane in which the annular disc is arranged and also bearing means should be arranged for rotatingly coupling the spokes to the axle.

In another embodiment of the invention, the wheel support comprises a tubular cross-member having a hollow interior. In this case, the axle is situated at least in part within the hollow interior of the tubular cross-member and the coupling means comprise a splined end of the axle cooperating with an interior surface of the tubular cross-member.

In still another embodiment, the assembly comprises a wheel support for retaining the wheel and comprising a fork having two prongs between which the wheel is situated, an elongate fixed axle having a central axis coincident with the rotational axis of the wheel and extending at least between the prongs, coupling means for fixedly coupling the axle to the wheel support to prevent rotation of the axle with respect to the wheel support and an annular disc coupled to the wheel. The coupling means comprise a first end of the axle being splined and a respective one of the prongs having a recess receivable of at least a portion of the first splined end of the axle. To attain the objects of the invention, the assembly includes an elongate radial arm having a first end attached to the first splined end of the axle and a second end opposite to the first end and a caliper mounted at the second end of the radial arm in a position so as to be engageable with the annular disc.

BRIEF DESCRIPTION OF THE DRAWINGS

The invention is illustrated by way of non-limiting example on the accompanying drawings, in which:

FIG. 1 shows a motorcycle front wheel with a caliper engaged on an annular disc brake, fixed internally in a central position to the tire support rim;

FIG. 2 is a schematic transverse view of the lower end of a fork;

FIG. 3 is a schematic cross-sectional view through an upper part of a front wheel equipped with one annular brake disc mounted centrally on the tire support rim;

DETAILED DESCRIPTION OF THE INVENTION

Figure 1A:
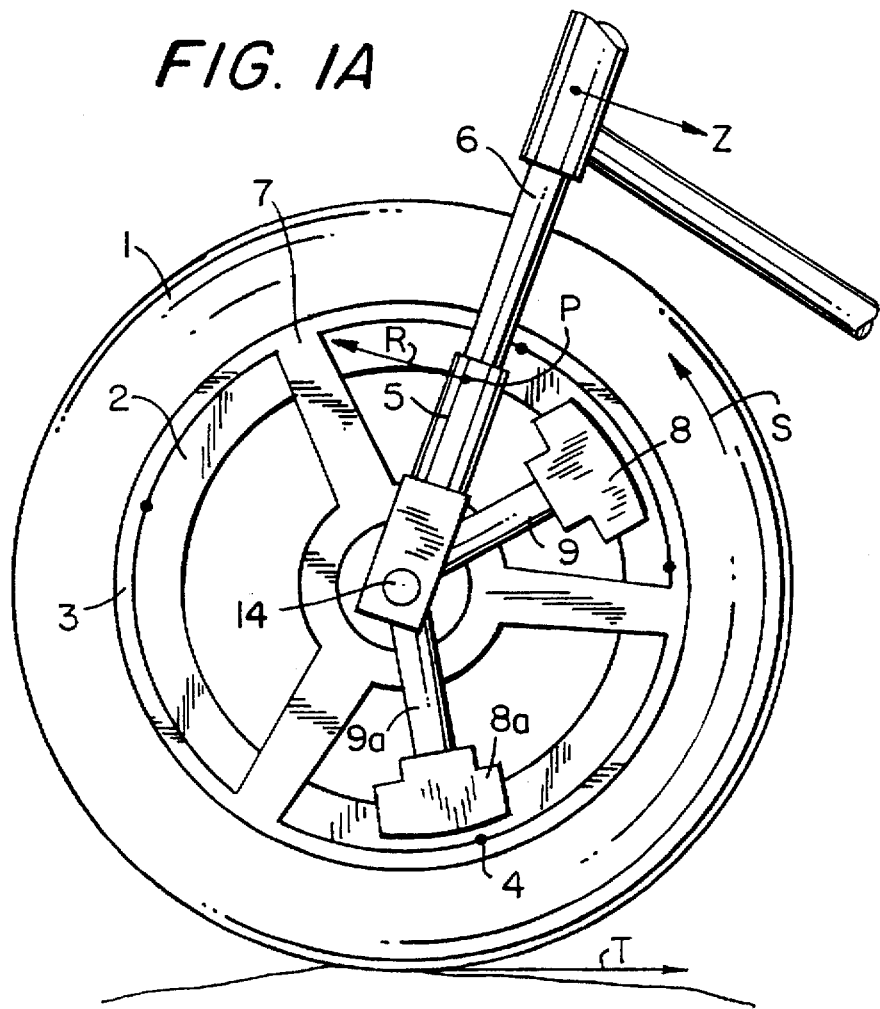
FIG. 1A shows a motorcycle front wheel with two radial arms and associated calipers operative against the same disc.

Referring first to FIG. 1, it can be seen how the fork of a generic (conventional) motorcycle is stressed by braking forces. The reference numeral 1 indicates a normal tire, reference numeral 2 indicates a brake disc fixed by conventional fixing means to a wheel rim 3, reference numeral 4 indicates conventional bushes for fixing the wheel rim 3 to the brake disc 2, reference numeral 5 indicates an unsprung lower pad of a fork 6, reference numeral 7 indicates the spokes joining the wheel hub to its rim 3 and reference numeral 8 indicates a brake caliper supported by a radial arm 9.

Assuming that the wheel rotates in the direction S, then when the caliper 8 grips the disc 2 (during braking activity), it is also urged to rotate. This does not in fact happen because the caliper 8 is fixed to a fixed part of the motorcycle. In the usual art, this caliper is fixed to the unsprung part 5 of the fork, for example at a point P, so that the exerted braking force generates a reaction R. This reaction has to provide balance between the friction force T on the road and a weight force Z deriving from the moment created by the weight of the entire motorcycle plus the driver about the point of contact of the front wheel with the ground. In this manner, the force R causes flexure of the fork 6 which, by allowing the caliper 8 to retract, results in a certain gradualness in braking. The position of the point P is directly related to the diameter of the annular disc 2, on which it operates. That is, if the braking tracks were of a smaller diameter they would locate the point P in a position closer to the center of the wheel. This would cause the flexure of the fork 6 to increase and would theoretically make braking more gradual, if it were not for the fact that in practice it would mean less extensive tracks and hence subjecting the calipers to a higher operating temperature, so making them inoperable.

The present invention allows a compromise between these two optimum conditions. In this respect, it enables disc tracks to be used which are of considerable length while at the same time increasing to a maximum the elastic retraction of the caliper 8. This is achieved by fixing the caliper not directly on the forks (i.e., on the point P), but on an arm 9 which is rigidly connected with a central axle 14 coaxial to the wheel (i.e., having a central axis coincident with the rotational axis of the wheel) and having its ends keyed to the fork ends 5. In this manner, the caliper 8 no longer operatively acts on the fork at the point P, but instead with a "force torque" having its center at 14, in a position which in cooperation with the weight force Z creates maximum flexure of the fork. This fork flexure is however not an essential element for the purposes of the invention. It is merely one possible consequence which is acceptable to the extent in which it is freely required.

In this respect, one requirement of the invention is the elastic retraction of the caliper, this requirement also being achievable with a fork theoretically indeformable by the flexural stresses. The retraction of the caliper could in fact be totally delegated to the intrinsic torsional elastic deformability of the central axle 14. As can be seen from FIG. 3, the axle 14 is made rigid with the central arm 9 by conventional (usual) means 13 and is keyed at its ends into the unsprung lower part 5 of the fork. This keying is indicatively achievable by a splined profile of the type 11, indicated in FIG. 2. FIG. 2 shows an example of a constructional detail comprising an end 5a dovetail-inserted and fixed by bolts 12.

The axle 14 is provided for supporting bearings 15 for the spoked wheel 7 which are interposed between the support arm 9 for the caliper 8 and the unsprung lower part 5 of the fork 6, via usual spacers D1–D2. This assembly is tightened together by nuts 16. The axle 14 is axially bored to achieve continuity of a conventional (usual) hydraulic conduit B for operating the caliper 8.

Figure 4:
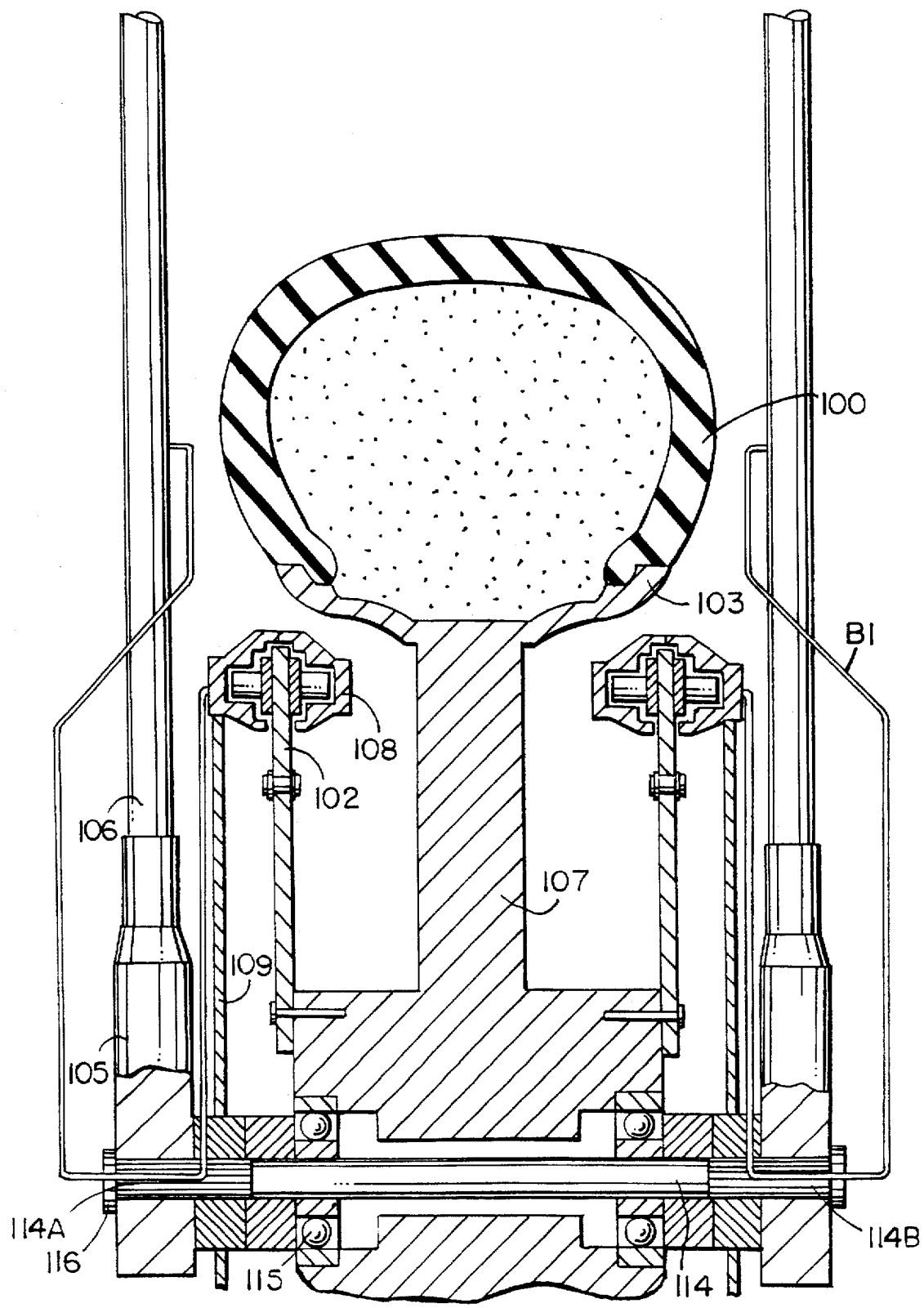
FIG. 4 is a schematic cross-sectional view through an upper part of a front wheel equipped with two brake discs mounted in a lateral position on the wheel hub.

FIG. 4 shows an implementation of the invention using two normal brake discs. In FIG. 4, those elements functionally analogous to that shown in FIG. 3 are indicated by the reference numerals of this latter plus 100. Hence, reference numeral 107 indicates the spoked wheels, reference numeral 115 indicates the bearings, reference numeral 102 indicates the brake discs, reference numeral 109 indicates the support arms for the calipers 108, reference numeral 103 indicates the wheel rim, reference numeral 105 indicates the unsprung lower part of the fork 106, and reference numeral 116 indicates the nuts for tightening together the elements mounted on the axle 14. Reference character B1 schematically indicates the hydraulic conduit for operating the calipers 108. In this embodiment, it can be seen that the axle 114 is splined at both its ends 114a and 114b to enable both the arms 109 and the unsprung lower parts 105 of the fork 106 to be keyed onto them. Also in this embodiment, the elasticity of the brake is entrusted totally to the fork 106.

Figure 5:
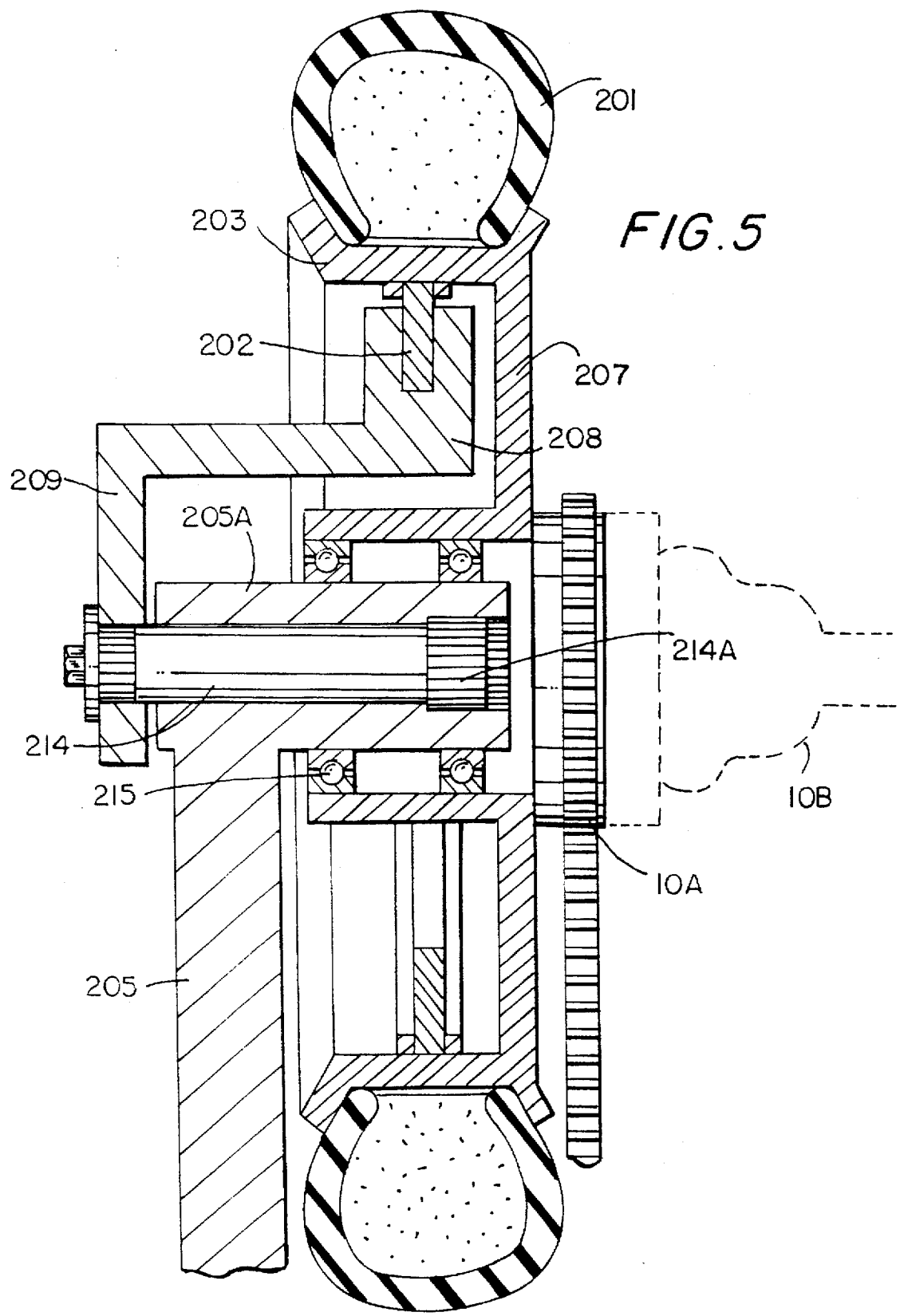
FIG. 5 is a sectional view through a generic wheel projectingly mounted on a horizontal arm and with the brake caliper reacting with the torsion bar.

With reference to FIG. 5, the illustrated generic wheel could be used as the front wheel of a motorcycle with single arm front suspension, or could be used as the rear drive wheel of a motorcycle, or again could be used as a drive or idle wheel of a motor vehicle. In FIG. 5, these parts in common with the above-described embodiments are indicated by the same reference numerals plus 200. The caliper 208 is supported by an arm 209 rigid with an axle 214 provided with a splined end 204a keyed into the interior of a tubular cross-member 205a of a swinging support 205. The swinging support 205 is obviously horizontal, is spring-loaded and forms the suspension. With the wheel 207, there can be associated a sprocket 10a for a chain drive or a live axle head 10a.

From the indicated embodiments, it is apparent that as the caliper derives its reaction from an axial central position, it can be positioned practically at any angle within the 360° of a complete revolution, i.e., clearly a plurality of calipers positioned at the vertices of two, three, four, . . . support arms can be arranged circumferentially on the brake disc. In this regard, FIG. 1A shows two radial arms 9 each having an associated caliper 8, both calipers being operative against the same brake disc 2. Advantageously, this allows much lower pressures to be used for operation, and likewise to provide large braking surfaces, thereby making braking more effective.

A further advantage offered by the invention is that it allows the use of brake discs of annular shape fixed directly to the wheel rim. A further advantage is that it enables the caliper to be positioned at any angular position without being constrained by the angular position of the motorcycle fork. Another advantage is that in an extremely simple and reliable manner it provides progressive braking which reduces the possibility of wheel locking. Still another advantage is that it prevents the sudden generation of moments at the fork in the horizontal plane resulting from unbalanced braking consequent on only one disc or on discs braked non-simultaneously.

What is claimed is:

1. A motorcycle suspension and wheel assembly for a wheel of a motorcycle having a rotational axis, the assembly including a disc brake system, comprising
   a wheel support for retaining the wheel,
   a rim for retaining a tire on an outer surface thereof, said rim having an inner surface facing the rotational axis of the wheel, edges and a width defined between said edges of said rim,
   a fixed axle having a central axis coincident with the rotational axis of the wheel,
   coupling means for fixedly coupling said axle to said wheel support to prevent rotation of said axle with respect to said wheel support,
   an annular disc having a hollow central region and arranged to surround said axle such that said axle is situated in the hollow central region of said annular disc, said annular disc being mounted directly on said inner surface of said rim in a middle position between said edges of said rim,
   an elongate radial arm having a first end rigidly attached to said axle and a second end opposite to said first end, and
   a caliper mounted at said second end of said radial arm in a position so as to be engageable with said annular disc.

2. The assembly of claim 1, wherein said wheel support comprises a fork having two prongs between which the wheel is situated, said axle being elongate and extending at least between said prongs, said coupling means comprising at least one end of said axle being splined and a portion of a respective one of said prongs of said wheel support having a recess receivable of said splined end of said axle.

3. The assembly of claim 1, wherein said wheel support comprises a fork having two prongs between which the wheel is situated, said axle being elongate and extending at least between said prongs, said coupling means comprising each end of said axle being splined and a portion of each of said prongs of said wheel support having a recess receivable of a respective one of said splined ends of said axle.

4. The assembly of claim 1, wherein said coupling means comprise an antirotation seat arranged in connection with said wheel support, an end of said axle being torsionally keyed into said antirotation seat.

5. The assembly of claim 1, wherein said axle is structured and arranged to provide an elastic torsion bar function.

6. The assembly of claim 1, further comprising attachment means for rigidly attaching said radial arm to a central portion of said axle.

7. The assembly of claim 1, further comprising an additional elongate radial arm having a first end rigidly attached to said axle and a second end opposite to said first end, and an additional caliper mounted at said second end of said additional radial arm in a position so as to be engageable with said annular disc, said additional radial arm being angularly spaced about said axle from said radial arm.

8. The assembly of claim 1, wherein said annular disc has an outer edge adjacent said inner surface of said rim, said outer edge of said annular disc having a diameter substantially equal to the diameter of said inner surface of said rim.

9. The assembly of claim 1, wherein the wheel comprises elongate spokes rotatingly coupled at a first end to said axle and fixedly coupled at a second end opposite to said first end to said rim.

10. The assembly of claim 9, wherein said annular disc is planar and situated in a plane, said spokes being arranged in a plane substantially parallel to the plane in which said annular disc is arranged.

11. The assembly of claim 9, further comprising bearing means for rotatingly coupling said first end of said spokes to said axle whereby said spokes are not connected to said annular disc.

12. The assembly of claim 1, wherein said rim extends circumferentially around the wheel and said annular disc extends circumferentially around said rim.

13. The assembly of claim 1, further comprising a bore arranged at least in part in said axle for enabling passage of hydraulic fluid to said caliper.

14. The assembly of claim 1, wherein said wheel support comprises a removable end, said coupling means comprising at least one end of said axle being splined and said removable end of said wheel support having a recess receivable of said splined end of said axle.

15. The assembly of claim 1, wherein said wheel support comprises a tubular cross-member having a hollow interior, said axle being situated at least in part within said hollow interior of said tubular cross-member and said coupling means comprising a splined end of said axle cooperating with an interior surface of said tubular cross-member.

16. A motorcycle suspension and wheel assembly for a wheel of a motorcycle having a rotational axis, the assembly including a disc brake system, comprising
   a wheel support for retaining the wheel, said wheel support comprising a fork having two prongs between which the wheel is situated, a fixed axle having a central axis coincident with the rotational axis of the wheel, said axle being elongate and extending at least between said prongs, coupling means for fixedly coupling said axle to said wheel support to prevent rotation of said axle with respect to said wheel support, said coupling means comprising a first end of said axle being splined and a respective one of said prongs having a recess receivable of at least a portion of said first splined end of said axle, an annular disc coupled to the wheel, an elongate radial arm having a first end attached to said first splined end of said axle and a second end opposite to said first end, and a caliper mounted at said second end of said radial arm in a position so as to be engageable with said annular disc.

17. The assembly of claim 16, wherein said coupling means comprise a second end of said axle being splined such that each of said prongs has a recess receivable of at least a portion of a respective one of said first and second splined ends of said axle.

18. The assembly of claim 17, further comprising an additional annular disc coupled to the wheel, an additional elongate radial arm having a first end attached to said second splined end of said axle and a second end opposite to said first end, and an additional caliper mounted at said second end of said additional radial arm in a position so as to be engageable with said additional annular disc.

* * * * *